United States Patent [19]

Peuterbaugh

[11] Patent Number: 5,341,710
[45] Date of Patent: * Aug. 30, 1994

[54] COUPLING STRUCTURE AND METHOD

[75] Inventor: Bruce G. Peuterbaugh, Warren, Mich.

[73] Assignee: J. P. Tool, Inc., Macomb, Mich.

[*] Notice: The portion of the term of this patent subsequent to Mar. 30, 2006 has been disclaimed.

[21] Appl. No.: 688,249

[22] Filed: Jan. 2, 1985

[51] Int. Cl.$^5$ .............................. B23C 5/26
[52] U.S. Cl. ............... 409/234; 408/239 R; 279/83; 279/97
[58] Field of Search ............ 409/231, 232, 234; 279/83, 86, 97; 408/239 R, 239 A; 407/50, 94, 108, 109, 110; 403/153, 290, 374, 379; 411/44, 45, 49

[56] References Cited

U.S. PATENT DOCUMENTS

| 145,364 | 12/1873 | Roberts, Jr. | 279/86 |
| 267,060 | 11/1882 | Buell | 279/97 |
| 366,432 | 7/1887 | Schwab | 279/97 |
| 628,530 | 7/1899 | Gozzard | 279/2.03 X |
| 1,132,375 | 3/1915 | Myers | 279/97 |
| 1,164,161 | 12/1915 | Ayers | 279/97 |
| 1,354,636 | 10/1920 | Whitfield | 407/109 |
| 1,535,941 | 4/1925 | Myers | 279/97 |
| 3,069,937 | 12/1962 | Williams | 407/108 |
| 3,664,258 | 5/1972 | Vecchi | 403/290 |
| 3,763,727 | 10/1973 | Hoke | 82/36 R |
| 4,063,843 | 12/1977 | Barkley et al. | 408/146 |
| 4,292,866 | 10/1981 | Kaczynski | 82/36 R |
| 4,575,293 | 3/1986 | Berti | 409/234 |
| 4,581,811 | 4/1986 | Eckle | 29/568 |
| 4,617,848 | 10/1986 | Eckle et al. | 408/239 R X |
| 4,634,324 | 1/1987 | Eckle et al. | 409/209 |

FOREIGN PATENT DOCUMENTS

| 353821 | 5/1922 | Fed. Rep. of Germany | 407/109 |
| 0775751 | 1/1935 | France | 279/97 |
| 2094191 | 9/1982 | United Kingdom | 409/234 |
| 2164276 | 3/1986 | United Kingdom | 409/234 |

OTHER PUBLICATIONS

American Machinist, Aug. 30, 1945, p. 132 "Threaded Lock-Pin Replaces Taper Pin in Toolholder".

Primary Examiner—Z. R. Bilinsky
Attorney, Agent, or Firm—Basile and Hanlon

[57] ABSTRACT

A coupling structure includes a coupling member having a cylindrical, axially slotted end with a cylindrical opening extending therethrough and perpendicular thereto having an axis of generation parallel to the sides of the slot and including a conical surface, a conical member within the opening having a conical surface in contact with the opening's conical surface and threaded structure for axially adjustably securing the conical member in the opening. A tapered liner may surround the slotted end of the coupling member and a threaded insert may be provided over one end of the opening for receiving an end of the conical member. One embodiment includes one conical surface in the opening and one conical member provided within the opening. A second embodiment includes two separate conical surfaces in the opening along with two separate conical members in opposite ends of the opening connected by and axially adjustable along a liner member. A coupling method includes securing a coupling member having a slot in one end thereof to a second member by passing a conical member into the slot transversely of the coupling member to expand the one end of coupling member in a recess in the second member while urging the coupling member into the recess. One embodiment includes passing a single conical member into a conical opening in the slot. In a second embodiment, conical members are provided in both ends of the opening in the slot.

15 Claims, 3 Drawing Sheets

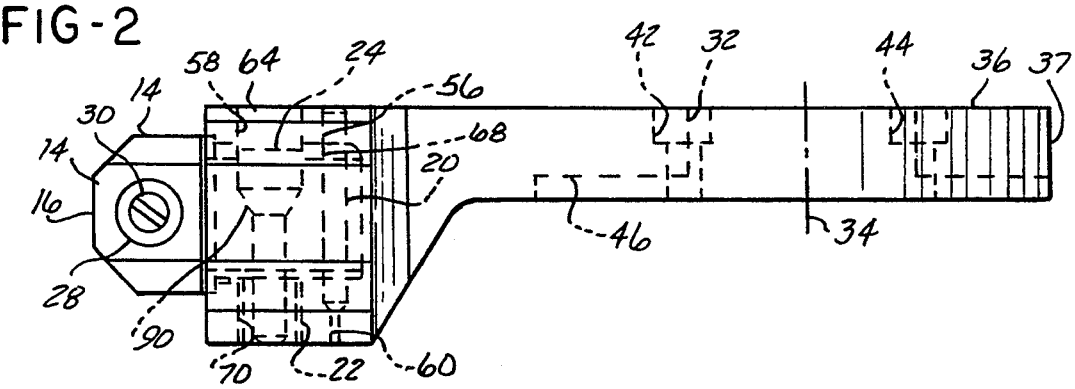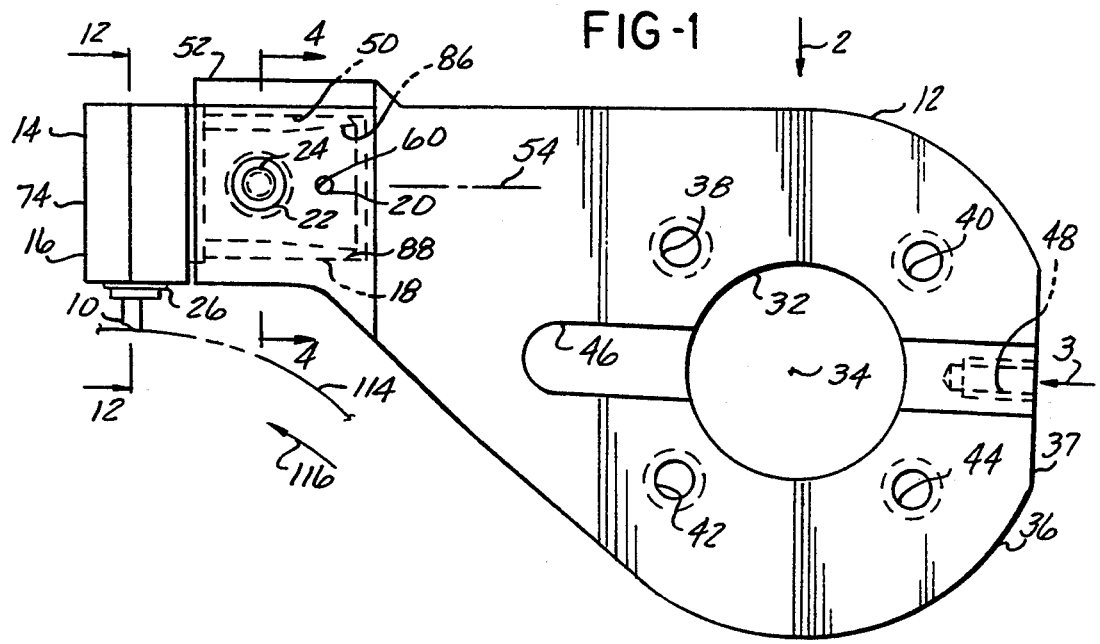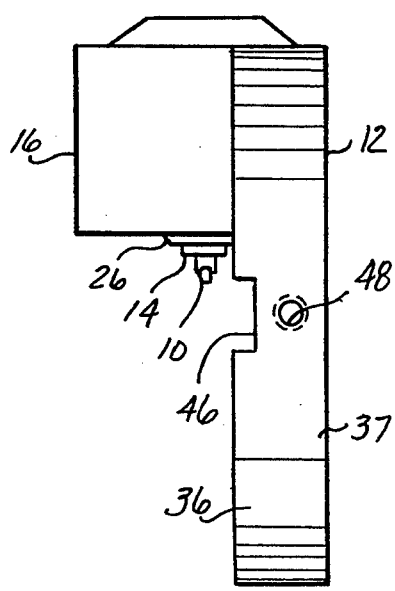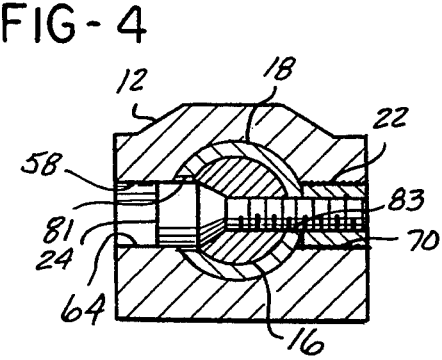

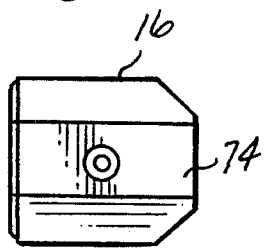
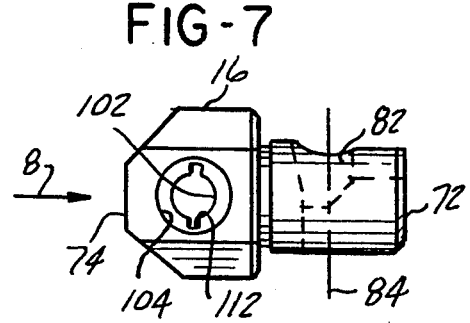
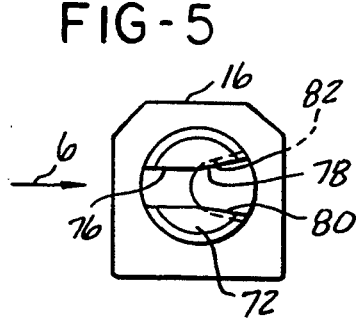
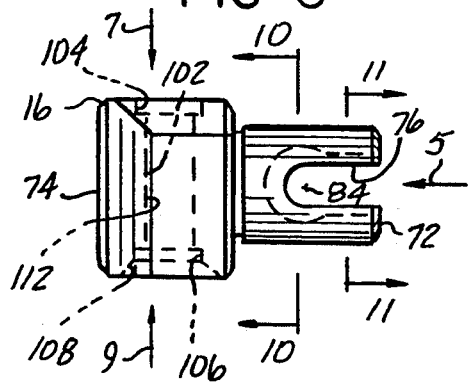
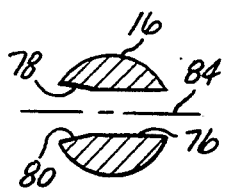
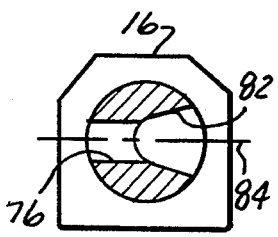
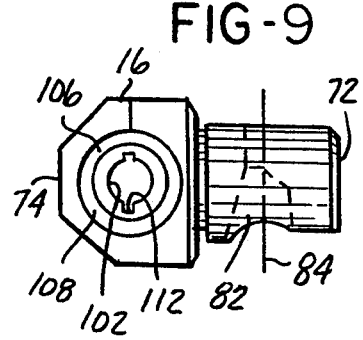
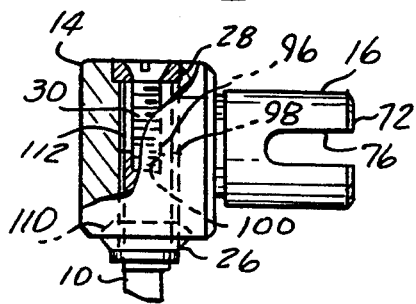
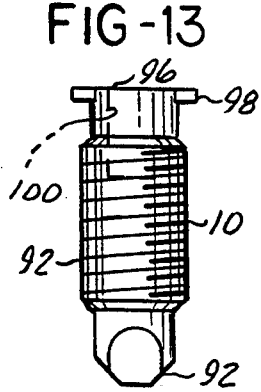

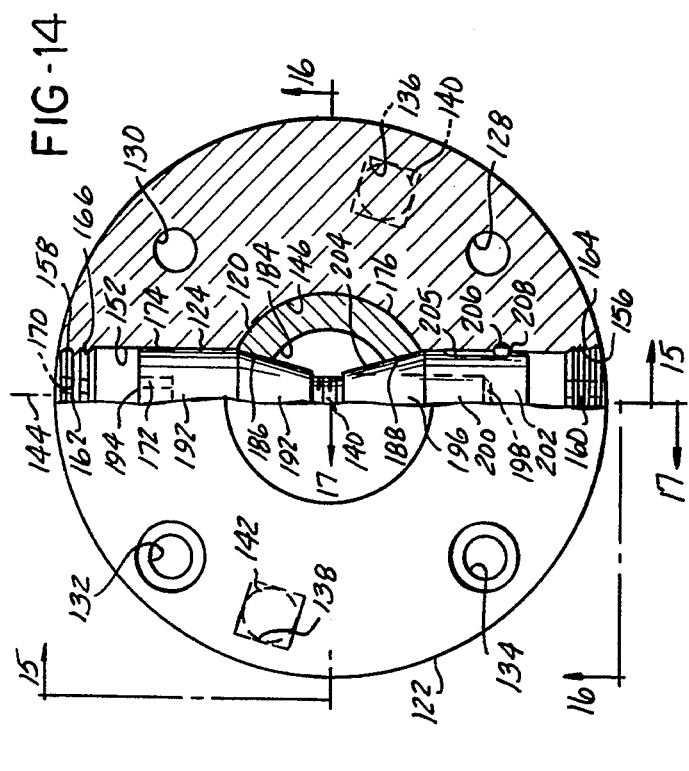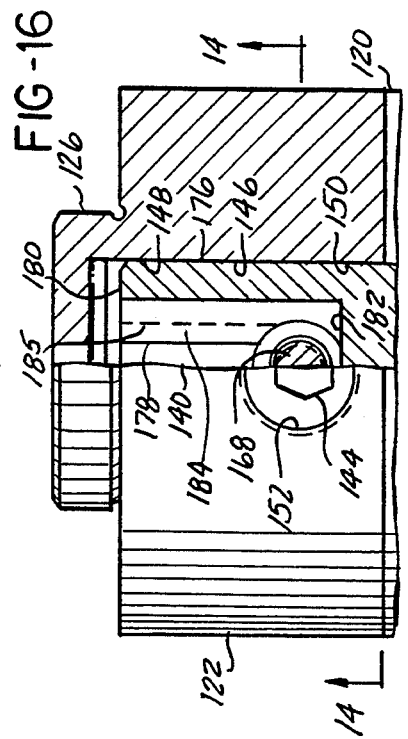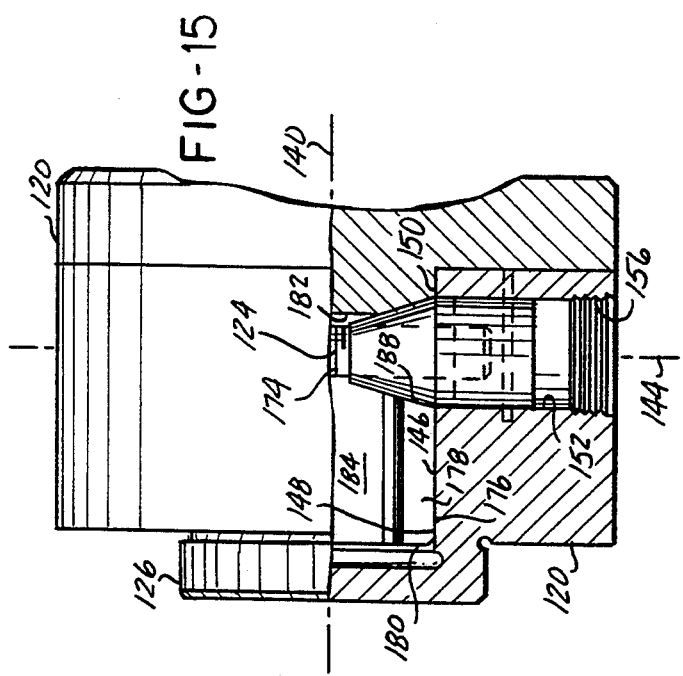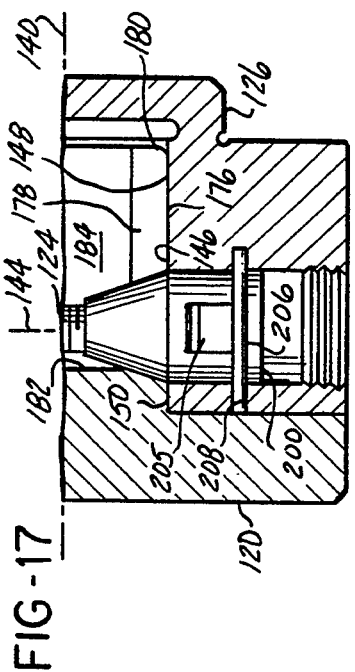

COUPLING STRUCTURE AND METHOD

BACKGROUND OF THE INVENTION

1. Field of the Invention

The invention relates to coupling structures and methods and refers more specifically to a method of and structure for securing a coupling member to a tool holder. The structure includes conical means for expanding one end of a coupling member in a recess in a tool holder. The method of securing the coupling member to the tool holder comprises drawing one end of the coupling member into a recess in the tool holder and then expanding the one end of the coupling member in the recess in the tool holder.

2. Description of the Prior Art

In prior coupling structures and methods wherein separate tool bit holders, for example, including coupling members have been used between tool bits and tool holders, such tool bit holders have necessarily been positioned with respect to the tool holders and the cutting force applied so that the cutting force has not tended to remove the tool bit holders from the tool holder. In such past coupling structures and methods, the cutting force has necessarily tended to secure the tool bit holders to the tool holder since no special precautions have been taken in prior structures and methods to insure that the tool bit holders remain in an exact position the tool holders if the cutting force is applied so as to tend to remove the tool bit holders from the tool holders.

SUMMARY OF THE INVENTION

As indicated above, the invention is a coupling structure for and method of securing a coupling member to a tool holder.

In one embodiment of the invention a tool holder is adapted to be rotated about a mounting axis to place a tool bit secured thereto by a tool bit holder including a coupling member into or move the tool bit out of engagement with a member to be machined. In this embodiment, the structure for securing a tool bit to a tool holder includes a tapered liner position within a recess in one end of the tool holder, a threaded insert extending perpendicular to the recess in the tool holder and in engagement with the side of the liner, a slot in one end of the coupling member of the tool bit holder, an opening extending through the one end of the tool bit holder having a conical surface extending axially, transversely through the axis of the slot and a wedge screw having a complimentary conical surface thereon engaged with the conical surface of the opening and including a threaded end for engaging the threaded insert and squeezing the liner between the insert and one end of the tool bit holder to urge the one end of the tool bit holder axially into the liner and expand the one end of the tool bit holder radially into locking engagement with the liner.

In another embodiment of the invention, two conical surfaces are provided in an opening through a slotted shank of a coupling member of quick change tool structure cooperable with a conical screw and conical nut extending through an opening in a tool holder and through the opening in the shank to first draw the coupling member into a recess in the tool holder and then to expand the shank of the coupling member in the recess in the tool holder from opposite sides of the shank of the coupling member.

The method of securing a tool bit holder including a coupling member to a tool holder in accordance with the one embodiment of the invention includes urging one end of the coupling member into a recess in the tool holder and subsequently expanding the one end of the coupling member in a tapered sleeve in the recess. In the other embodiment of the method of the invention, the shank of a coupling member of quick change tool structure is drawn into a recess in a tool holder and then expanded therein by means of a conical bolt and nut passed through the tool holder and an opening in the slotted shank of the coupling member having opposed conical surfaces therein complimentary to conical surfaces on the bolt and nut.

BRIEF DESCRIPTION OF THE DRAWINGS

FIG. 1 is a side view of a tool holder showing a tool bit secured thereto by means of a tool bit holder located between the tool bit and tool holder and including a coupling member in accordance with the structure of the invention for practicing the method of the invention.

FIG. 2 is a top view of the structure illustrated in FIG. 1 taken substantially in the direction of arrow 2 in FIG. 1.

FIG. 3 is an end view of the structure illustrated in FIG. 1 taken substantially in the direction of arrow 3 in FIG. 1.

FIG. 4 is a section view of the structure illustrated in FIG. 1 taken substantially on the line 4—4 in FIG. 1.

FIG. 5 is an end view of the coupling member of the tool bit holder shown in FIG. 1 taken substantially in the direction of arrow 5 in FIG. 6.

FIG. 6 is a side view of the coupling member illustrated in FIG. 5 taken substantially in the direction of arrow 6 in FIG. 5.

FIG. 7 is a top view of the coupling member illustrated in FIG. 6 taken substantially in the direction of arrow 7 in FIG. 6.

FIG. 8 is an end view of the coupling member illustrated in FIG. 6 taken substantially in the direction of arrow 8 in FIG. 7.

FIG. 9 is a bottom view of the coupling member illustrated in FIG. 6 taken substantially in the direction of arrow 9 in FIG. 6.

FIG. 10 is a section view of the coupling member illustrated in FIG. 6 taken substantially on the line 10—10 in FIG. 6.

FIG. 11 is a section view of the coupling member illustrated in FIG. 6 taken substantially on the line 11—11 in FIG. 6.

FIG. 12 is a partly broken away view of the tool bit holder including the coupling member and structure for securing a tool bit thereto substantially in the position shown in FIG. 1.

FIG. 13 is an enlarged elevation view of the tool bit illustrated in FIG. 12 secured to the tool bit holder.

FIG. 14 is an end view of modified coupling structure constructed in accordance with the invention for practicing the invention which is partly in section and which is taken substantially on the line 14—14 in FIG. 16.

FIG. 15 is a view of the coupling structure illustrated in FIG. 14 which is partly in section and is taken substantially on the line 15—15 in FIG. 14.

FIG. 16 is another view of the coupling structure illustrated in FIG. 14 which is partly in section and is taken substantially on the line 16—16 in FIG. 14.

FIG. 17 is a partial section view of the coupling structure illustrated in FIGS. 14-16 taken substantially on the line 17—17 in FIG. 14.

DESCRIPTION OF THE PREFERRED EMBODIMENTS

As shown best in FIG. 1, a tool bit 10 is secured to a tool holder 12 by a tool bit holder 14. The tool bit holder 14 includes the coupling member 16, liner 18, pin 20, insert 22 and the wedge screw 24. The tool bit 10 is secured in the tool bit holder 14 by the collar 26, washer 28 and screw 30, as shown best in FIG. 12.

More specifically, the tool holder 12 shaped as shown best in FIGS. 1,2 and 3, includes a cylindrical opening 32 extending therethrough on the axis of rotation 34 of the one end 36 thereof. Openings 38, 40, 42 and 44 also extend through the end 36 of the tool holder 12 as shown best in FIG. 1. The dual diameter openings 38, 40, 42 and 44 receive bolts not shown which secure the tool holder 12 onto a machine arm likewise not shown, operable to rotate the tool holder 12 about the axis 34. The flat portion 37 of end 36 and the elongated recess 46 and threaded opening 48 in the end 36 of the tool holder 12, aid in the securing of the tool holder 12 to the machine arm for rotation about the axis of rotation 34 of the tool holder 12.

The tool holder 12 further includes a recess 50 in the end 52 thereof. The recess 50 is cylindrical and is symetrical about an axis of generation thereof 54 which is offset from but perpendicular to the axis of rotation 34 of the tool holder 12. The openings 56 and 58 are also provided through the end 52 of the tool holder 12 and extend parallel to but spaced apart from the axis 34 and each other.

Opening 56 is a dual diameter opening provided for the purpose of receiving the retaining pin 20 as will be seen subsequently. The opening 58 may also be a dual diameter hole for receiving the wedge screw 24 in the end 64 thereof and for receiving the insert 22 in the end 70 thereof.

The coupling member 16 as shown best in FIGS. 5 through 11 includes a cylindrical end 72 and a generally rectangular end 74. The cylindrical end 72 is adapted to fit within the tapered insert 18 within the recess 50 in the tool holder 12 as shown best in FIG. 1.

The structure associated with the end 72 of the coupling member 16 functions to secure the coupling member 16 in a predetermined position on the tool holder 12 in accordance with the method of the invention.

The tool bit 10 is secured to the end 74 of the coupling member 16. The structure associated with the end 74 of the coupling member 16 functions to adjustably secure the tool bit 10 to the coupling member 16 and forms no part of the invention.

The end 72 of the coupling member 16 is cylindrical and includes the slot 76 extending axially thereinto as shown best in FIG. 6. The edges 78 and 80 of the slot 76 are tapered as shown in FIG. 11. A conical surface 82 is produced about an axis 84 at the inner end of the slot 76.

In use, in accordance with the method of the invention, the sleeve 18 with the inner surface 86 tapered to provide a larger diameter at the inner end 88 thereof as shown in FIG. 1 is positioned within the recess 50 in the tool holder 12. The liner 18 is secured in the recess 50 by the pin 20 extending through the opening 56 in the tool holder 12 and similar opening 68 in sleeve 18. The small diameter end 60 of the opening 56 permits removal of the pin 20 by an object inserted through the smaller diameter end 60 of the opening 56.

In assembly, in accordance with the method of the invention, the end 72 of the coupling member 16 is inserted within the tapered liner 18 and internally and externally threaded insert 22 is threaded into the threaded end 70 of the opening 58 in the tool holder 12 and is abutted against the side of the liner 18 as shown best in FIG. 4. A wedge screw 62 is then inserted into the opening 58 in the tool holder 12 and through opening 81 and 83 in liner 18 and is threadedly engaged with the insert 22.

Tightening of the wedge screw 24 first exactly positions the end 72 of the coupling member 16 axially within the recess 50 with the conical surfaces of the wedge screw 24 and the coupling member 16 in surface-to-surface contact. In addition, the wedge screw 24 on being tightened subsequently causes the end 72 of the coupling member 16 to expand into contact with the tapered liner 18 to securely hold the coupling member 16 in the recess 50.

It will be understood that in one embodiment of the invention, the tool holder 12 is aluminum and the liner 18 and insert 22 are steel as are the wedge screw 24 and coupling member 16. Thus, the liner 18 held in place by the steel pin 20 is compressed between the steel insert 22 and the coupling member 16 on tightening of the steel wedge screw in assembly. Wear on the aluminum tool holder 12 is thus minimized.

As shown best in FIG. 13, the tool bit 10 is provided with a threaded central section 92, a cutting end 94 and an inner end 96. Projections 98 are provided on the inner end 96 of the tool bit 10 for preventing rotation of the tool bit 10 in assembly, as will be seen subsequently.

To assemble the tool bit 10 on the end 74 of the coupling member 16 a threaded recess 100 is provided in the end 96 of the tool bit 10. An opening 102 having the larger diameter portions 104 and 106 at the opposite ends thereof is provided in the end 74 of the coupling member 16 as shown best in FIG. 6. The enlarged end portion 106 of the opening is provided with a conical surface 108, again as shown best in FIG. 6.

A conical collar 26 having a mating conical surface complimentary to the conical surface 108 in the opening is threaded on the central portion 92 of the tool bit 10. The axial position of the collar 26 on the tool bit 10 will provide an axial adjustment of the tool bit 10. The end 96 of the tool bit 10 with the collar 26 threaded thereon is then inserted in the opening 102 so as to engage the conical surface 110 with the conical surface 108. Tabs 98 in slots 112 in opening 102 prevent rotation of the tool bit 10 in the opening 102. The tool bit 10 is then secured in the opening 102 by means of a headed screw 30 in the opening 102 passing through the washer 28 and threadedly engaging the end 96 of the tool bit 94 in the threaded recess 100. As the screw 30 is tightened, the tool bit 10 is adjusted radially to be centered in the opening 102 due to the meshing of the conical surfaces 108 and 110.

Since the structure for assembly of the tool bit 10 forms no part of the invention any other structure for securing the tool bit 10 to the tool bit holder 14 may be substituted therefore within the scope of the invention.

With the coupling member 16, thus securely held in the tool holder 12 and with the tool bit 10 securely held in the coupling member, the tool holder 12 may be rotated about the axis 34 thereof to position the tool bit 10 into and out of cutting engagement with for example a workpiece 114 as shown in FIG. 1 which may be rotated in the direction of arrow 116 without danger of the tool bit 10 or coupling member 16 becoming loose or moving to an out of tolerance position. Further, the tool bit 10 on the coupling member 16 may be removed from its mounting on and the tool holder 12 and replaced substantially without loss of tolerance as desired.

While one embodiment of the present invention has been considered in detail, it will be understood that other embodiments and modifications thereof are contemplated by the inventor.

Thus, while the coupling structure of the invention has been utilized as a tool bit holder as shown in FIGS. 1-13, it may also be utilized in quick change tool structure as shown in FIGS. 14-17 and in other coupling applications.

In the embodiment of the invention shown in FIGS. 14-17, a coupling member 120 is secured to a tool holder 122 by convenient means such as a conical nut and bolt structure 124. More specifically, the tool holder 122 is provided with a reduced diameter centering portion 126 and is adapted to be secured to a machine tool (not shown) by bolts extending through the openings 128, 130, 132 and 134 through which headed bolts may extend into a machine tool. As best shown in FIG. 14 these bolt openings are angularly spaced apart about the tool holder 122 by 90°. The tool holder 122 is also provided with locating openings 136 and 138 therein for angularly locating the coupling member 120 on the tool holder 122 about the axis 140 thereof in conjunction with locating dowels 140 and 142 which as shown in FIG. 14 are separated by 180° about the axis 140.

Tool holder 122 is further provided with a slightly tapered recess 146 therein which is conical and which has a larger end 148 and a smaller end 150, A single diameter opening 152 extends radially of the tool holder 122 as shown best in FIGS. 14 and 15. The opening 152 extends perpendicularly of the axis 140 and has an axis 144 which intersects the axis 140. The opposite ends 156 and 158 of the opening 152 are threaded to receive locking members 160 and 162 therein having threaded outer peripheries 164 and 166 and hexagonal inner peripheries 168 and 170 respectively. As shown best in FIG. 16, the hexagonal openings through the members 160 and 162 not only permit adjustment of the members 160 and 162 but also provide access to the hexagonal recess 172 in the conical bolt member 174 of the nut and bolt structure 124 for adjustment of the nut and bolt structure 124 as will be seen subsequently.

The coupling member 120 as shown includes a generally cylindrical, hollow shank 176 having an axis of generation on the axis 140 and further including a slot 178 extending on the axis 140 radially thereof and from the end 180 to the bottom surface 182 of the recess 183 in the hollow shank 176. Slot 178 is shaped similar to slot 76 in coupling member 16, but has the tapered edges on both sides thereof one of which is indicated at 185 since both the screw and nut have conical surfaces. The cylindrical shank 176 as best shown in FIG. 15 further includes the openings 186 and 188 therein which are aligned on the axis of generation 144 thereof and which have conical surfaces which diverge outwardly of the ends of the opening 152 through the tool holder 122. The openings 186 and 188 thus extend across the inner end of the slot 178 in the shank 176 of the coupling member 120.

As previously indicated, the coupling member 120 is provided with locating dowels 140 and 142 thereon adapted to extend within the locating recesses 136 and 138 of the tool holder 122. As shown, the coupling member 120 is a cylindrical member having the same outer diameter as the tool holder 122. Further, structure may be provided to the right of FIG. 15 for supporting a tool from the coupling member 120. Such structure is not part of the present invention and is therefor not shown.

The conical bolt 174 as shown best in FIGS. 14 and 15 includes a cylindrical head portion 190 and a conical head portion 192 at end 194 thereof and a smaller diameter threaded portion 196 at end 198.

The conical nut 200 of the nut and bolt structure 174 includes a cylindrical portion 202 and a conical portion 204 as shown best in FIG. 14. The nut 200 has a flat slot 205 in one side thereof cooperable with the pin 206 within the opening 208 in the tool holder 122 which structure serves to prevent rotation of the nut 200 within the opening 152 and to permit axial movement of the nut 200 in the opening.

In overall use of the quick change coupling structure illustrated in FIGS. 14-18 when it is desired to secure the coupling member 120 with a tool attached thereto for example to the tool holder 122 the nut and bolt structure 174 is loosened, the shank 176 of the coupling member 120 is inserted in the recess 146 in the tool holder and rotated to align the aligning dowels 140 and 142 with the openings 136 and 138 in the tool holder 122 whereby the slot 178 in the shank 176 is aligned with the opening 152 through the tool holder 122. The nut and bolt structure 174 if it is not previously in place is provided through the end openings 160 and 162 of the opening 152 and the conical nut 174 is threaded into the conical bolt 200. As the nut and bolt structure 174 is tightened the conical surfaces 200 and 192 thereon engage the mating conical openings 186 and 188 provided in the shank 176 of the coupling member 120 to first draw the coupling member 120 into tight engagement with the tool holder 122 and to then expand the shank 176 into tight engagement with the tapered recess 146 in the tool holder 122. The coupling member 120 is thus secured to the tool holder 122 against realtive axial and/or rotational movement as before.

To remove the coupling member 120 and any tools carried thereby from the tool holder 122 it is only necessary to release the locking members 160 and 162 and subsequently unscrew the conical bolt and nut and remove the coupling member 120 from the tool holder 122 axially.

It is the intention to include all modifications and embodiments of the invention as are defined by the appended claims within the scope of the invention.

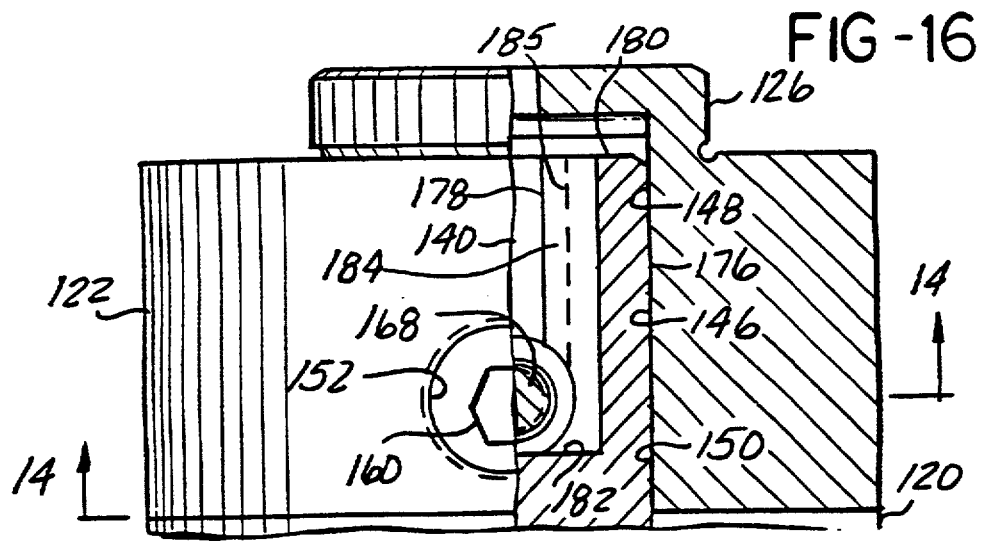

I claim:

1. In a coupling structure for connecting a tool coupling member to a mechanically driven, rotatable tool holder member, the improvement comprising:

said tool coupling member including an axis having in at least one end a slot extending axially into the one end of the tool coupling member; and threaded coupling means extending transversely of the slot into the tool coupling member for axially positioning the tool coupling member and for expanding the one end of the tool coupling member to lock the tool coupling member in assembly with the tool holder member, the threaded coupling means first urging the tool coupling member axially to position the tool coupling member with respect to the tool holder member prior to expanding the one end of the tool coupling member, the threaded coupling means including an opening through the one end of the tool coupling member perpendicular to an axis of the slot therein and on the axis thereof and having a conical surface, and a wedge screw within the opening having a mating conical surface thereon whereby on tightening of the wedge screw the one end of the coupling member is expanded.

2. In a coupling structure for connecting a tool coupling member to a mechanically driven, rotatable tool holder member, the improvement comprising:

a tool coupling member including an axis having in at least one end a slot extending axially into the one end of the tool coupling member; and means extending transversely of the slot into the tool coupling member for axially positioning the tool coupling member and for expanding the one end of the tool coupling member to lock the tool coupling member in assembly with the tool holder member, wherein the means for expanding the one end of the tool coupling member includes an opening through the one end of the tool coupling member perpendicular to an axis of the slot therein and on the axis thereof having conical surfaces diverging outwardly of each end thereof and conical members in surface-to-surface engagement with the conical surfaces of the opening through the conical member and means for securing the conical members together permitting relative axial adjustment therebetween.

3. The coupling structure as set forth in claim 2 wherein the conical members are a conical nut and a conical bolt.

4. The coupling structure as set forth in claim 3 and further including means operably associated with at least one of the conical members for limiting rotation thereof.

5. A tool holder comprising:

a body member having an axis of rotation extending through the body member and a sidewall defining a recess formed in the body member with a transversely extending aperture formed in the sidewall of the recess;

means for securing the body member to structure for rotating the body member about the axis of rotation;

a coupling member including an elongated one end having a radially and longitudinally extending slot, said one end positioned within the recess of the body member; and means extending transversely into the slot in the one end of the coupling member from the aperture in the sidewall of the body member for expanding the one end of the coupling member within the recess of the body member to secure the coupling member to the body member, said expanding means passing through said slot during insertion of said coupling member within said recess of said body member.

6. The coupling structure as set forth in claim 5 wherein the end of the coupling member within the recess is cylindrical, a slot is provided extending axially of the cylindrical end of the coupling member within the recess and the means for expanding the one end of the coupling member is a conical opening extending radially through the cylindrical end of the coupling member on the axis of the slot therethrough and a wedge screw having a conical head and operable between the body member and the conical opening through the coupling member to expand the one end of the coupling member within the recess of the body member.

7. A method of securing a tool to a tool holder having a recess therein comprising the steps of:

securing the tool to an elongate coupling member including a first transversely extending radial aperture adjacent one end, at least a portion of the radial aperture defining at least one generally conically-shaped surface, the first transversely extending radial aperture communicating with a longitudinally extending slot through the one end;

passing threaded lock means into the recess in the tool holder through a second transversely extending radial aperture;

inserting the one end of the coupling member into the recess in the tool holder;

passing the threaded lock means into the first transversely extending radial aperture adjacent the one end of the coupling member through the slot during insertion of the coupling member within the recess of the tool holder; and positioning the coupling member by engagement with the at least one generally conically-shaped surface and simultaneously locking the coupling member in assembly with the tool holder when the threaded lock means is threadingly driven to operably engage the conically-shaped surface.

8. A method of securing a tool to a tool holder having a recess therein comprising the steps of:

securing the tool to a coupling member including a slotted one end;

inserting the slotted one end of the coupling member into the recess in the tool holder;

passing threaded means into the recess, the threaded means for transversely expanding the slotted one end of the coupling member within the recess transversely of the slot in the one end of the coupling member; and inserting a tapered liner in the recess in the tool holder prior to inserting the one end of the coupling member into the recess.

9. A method of securing a tool to a tool holder having a recess therein comprising the steps of:

securing the tool to a coupling member including a slotted one end defined by two edges spaced apart from one another by a predetermined width, said two edges extending longitudinally from the one end to an inner end;

inserting the slotted one end of the coupling member into the recess in the tool holder;

positioning within the recess threaded coupling means for transversely expanding the slotted one end of the coupling member within the recess transversely of the slot in the one end of the coupling member; and providing a conical opening through the slotted one end of the coupling member on the axis of the slot and wherein the threaded coupling means for transversely expanding the slotted one end of the coupling is a threaded shank having a diameter less than the width of the slotted one end and a conical member connected to the threaded shank passed into the conical opening with the conical member in surface-to-surface engagement with the conical opening and the coupling member to expand the slotted one end of the coupling member to lock the coupling member in assembly with the tool holder, such that the threaded coupling means is operable between a coupled position and a release position, said coupled position firmly engaging said conical member with said conical surface and expanding said cylindrical portion of said coupling member sufficiently to lock the coupling member in assembly with the tool holder, and said release position radially spacing said conical member from said conical surface sufficiently to allow axial withdrawal of said cylindrical portion of said coupling member from said recess of said tool holder by passing said diameter of said threaded shank through said width of said slot.

10. A method of securing a tool to a tool holder having a recess therein comprising the steps of:
 securing the tool to a coupling member including a slotted one end;
 inserting the slotted one end of the coupling member into the recess in the tool holder;
 passing into the recess means for transversely expanding the slotted one end of the coupling member within the recess transversely of the slot in the one end of the coupling member; and
 providing a conical opening through the slotted one end of the coupling member on the axis of the slot and wherein the means for transversely expanding the slotted one end of the coupling member is a conical member passed into the conical opening with the conical member in surface-to-surface engagement with the conical opening and the coupling member to expand the slotted one end of the coupling member, wherein the opening through the one end of the coupling member has two conical surfaces thereon diverging outwardly of the ends of the opening and further including inserting conical members into the opening in the coupling member from each end thereof in surface-to-surface engagement with the respective conical surfaces thereof and adjusting them axially of each other to expand the one end of the coupling member.

11. In a coupling structure for securing a coupling member to a mechanically driven, rotatable tool holder, the improvement comprising:
 the tool holder having a generally cylindrical recess symmetrical about an axis of generation thereof and an aperture perpendicular to and intersecting the axis of generation of said recess;
 the coupling member having a cylindrical longitudinally extending portion with a first end and two opposing edges spaced from one another by a predefined width defining a slot extending axially along a diametrical plane from said first end to an inner end, a conical surface formed symmetrically about a radial axis lying in said diametrical plane at said inner end of said slot, said radial axis alignable with said aperture of said tool holder when said cylindrical portion is axially engaged within said recess of said tool holder; and
 threaded coupling means engaged through said aligned aperture and slot to operably engage said conical surface for axially positioning the coupling member with respect to the tool holder and for expanding the first end of the coupling member with respect to the recess of the tool holder to lock the coupling member in assembly with the tool holder.

12. The improvement of claim 11 further comprising said threaded coupling means having an elongated threaded shank of a predetermined diameter less than the predetermined width of the slot in the coupling member and a conical member tapered inwardly symmetrically about a longitudinal axis of said threaded shank for operable engagement with the conical surface of the coupling member, said threaded coupling means operable between a coupled position and a release position, said coupled position firmly engaging said conical member with said conical surface and expanding said cylindrical portion of said coupling member sufficiently to lock the coupling member in assembly with the tool holder, and said release position radially spacing said conical member from said conical surface sufficiently to allow axial withdrawal of said cylindrical portion of said coupling member from said recess of said tool holder by passing said diameter of said threaded shank through said width of said slot.

13. The improvement of claim 11 further comprising:
 said coupling member having two opposite conical surfaces formed symmetrically about a diametrical axis lying in said diametrical plane at said inner end of said slot, said two conical surfaces tapering inwardly toward a longitudinal axis of cylindrical portion of said coupling member, said diametrical axis alignable with said aperture of said tool holder when said cylindrical portion is axially engaged within said recess of said tool holder; and
 said threaded coupling means including an elongated threaded shank of a predetermined diameter less than the predetermined width of the slot in the coupling member and two opposing conical members tapered inwardly symmetrically about a longitudinal axis of said threaded shank toward each other for operable engagement with the conical surfaces of the coupling member, said threaded coupling means operable between a coupled position and a release position, said coupled position firmly engaging said conical members with said conical surfaces of said coupling member and expanding said cylindrical portion of said coupling member sufficiently to lock the coupling member in assembly with the tool holder, and said release position radially spacing said conical members from said conical surfaces of said coupling member sufficiently to allow axial withdrawal of said cylindrical portion of said coupling member from said recess of said tool holder by passing said diameter of said threaded shank through said width of said slot.

14. A tool holder comprising:
 a body member having an axis of rotation extending through the body member and an elongated recess formed in the body member with at least one open end;
 means for securing the body member to structure for rotating the body member about the axis of rotation;
 a coupling member including one end positioned within the recess of the body member through the open end of the recess, the coupling member having a slot extending longitudinally from the one end; and means extending transversely with respect to the recess in the body member and into the one end of the coupling member for expanding the one end of the coupling member within the recess of the body member to secure the coupling member to the body member, the expanding means passing through the slot in the coupling member during longitudinal insertion of the coupling member within the recess in the body member prior to expanding the one end of the coupling member inside the recess of the body member.

15. A tool holder comprising:

a body member having an axis of rotation extending through the body member and a recess formed therein;

means for securing the body member to structure for rotating the body member about the axis of rotation;

a coupling member including one end positioned within the recess of the body member; and means extending transversely into the one end of the coupling member for expanding the one end of the coupling member within the recess of the body member to secure the coupling member to the body member, wherein the end of the coupling member within the recess is cylindrical, a slot is provided extending axially of the cylindrical end of the coupling member within the recess and the means for expanding the one end of the coupling member is a conical opening extending radially through the cylindrical end of the coupling member on the axis of the slot therethrough and a wedge screw having a conical head and operable between the body member and the conical opening through the coupling member to expand the one end of the coupling member within the recess of the body member.

* * * * *

UNITED STATES PATENT AND TRADEMARK OFFICE
CERTIFICATE OF CORRECTION

PATENT NO. : 5,341,710
DATED : August 30, 1994
INVENTOR(S) : Bruce G. Peuterbaugh It is certified that error appears in the above-indentified patent and that said Letters Patent is hereby corrected as shown below:

```
Column 3, line 12, after "liner" insert --or sleeve--.
Column 5, line 33, delete "140" and insert --141--.
Column 5, line 57, delete "183" and insert --184--.
Column 6, line 4, delete "140" and insert --141--.
Column 6, line 31, delete "140" and insert --141--.
Column 8, line 30, after "with" delete --the--.
```

Signed and Sealed this

Fourteenth Day of February, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,341,710

DATED : August 30, 1994

INVENTOR(S) : Bruce G. Peuterbaugh

It is certified that error appears in the above-indentified patent and that said Letters Patent is hereby corrected as shown below:

The title page, showing an illustrative figure, should be deleted and substitute therefor the attached title page.

Signed and Sealed this

Twelfth Day of September, 1995

Attest:

BRUCE LEHMAN

*Attesting Officer*          *Commissioner of Patents and Trademarks*

United States Patent [19]
Peuterbaugh

[11] Patent Number: 5,341,710
[45] Date of Patent: * Aug. 30, 1994

[54] COUPLING STRUCTURE AND METHOD

[75] Inventor: Bruce G. Peuterbaugh, Warren, Mich.

[73] Assignee: J. P. Tool, Inc., Macomb, Mich.

[*] Notice: The portion of the term of this patent subsequent to Mar. 30, 2006 has been disclaimed.

[21] Appl. No.: 688,249

[22] Filed: Jan. 2, 1985

[51] Int. Cl.$^5$ ................................................ B23C 5/26
[52] U.S. Cl. ........................................ 409/234; 408/239 R; 279/83; 279/97
[58] Field of Search ................ 409/231, 232, 234; 279/83, 86, 97; 408/239 R, 239 A; 407/50, 94, 108, 109, 110; 403/153, 290, 374, 379; 411/44, 45, 49

[56] References Cited

U.S. PATENT DOCUMENTS

| | | | |
|---|---|---|---|
| 145,364 | 12/1873 | Roberts, Jr. | 279/86 |
| 267,060 | 11/1882 | Buell | 279/97 |
| 366,432 | 7/1887 | Schwab | 279/97 |
| 628,530 | 7/1899 | Gozzard | 279/2.03 X |
| 1,132,375 | 3/1915 | Myers | 279/97 |
| 1,164,161 | 12/1915 | Ayers | 279/97 |
| 1,354,636 | 10/1920 | Whitfield | 407/109 |
| 1,535,941 | 4/1925 | Myers | 279/97 |
| 3,069,937 | 12/1962 | Williams | 407/108 |
| 3,664,258 | 5/1972 | Vecchi | 403/290 |
| 3,763,727 | 10/1973 | Hoke | 82/36 R |
| 4,063,843 | 12/1977 | Barkley et al. | 408/146 |
| 4,292,866 | 10/1981 | Kaczynski | 82/36 R |
| 4,575,293 | 3/1986 | Berti | 409/234 |
| 4,581,811 | 4/1986 | Eckle | 29/568 |
| 4,617,848 | 10/1986 | Eckle et al. | 408/239 R X |
| 4,634,324 | 1/1987 | Eckle et al. | 409/209 |

FOREIGN PATENT DOCUMENTS

| | | | |
|---|---|---|---|
| 353821 | 5/1922 | Fed. Rep. of Germany | 407/109 |
| 0775751 | 1/1935 | France | 279/97 |
| 2094191 | 9/1982 | United Kingdom | 409/234 |
| 2164276 | 3/1986 | United Kingdom | 409/234 |

OTHER PUBLICATIONS

American Machinist, Aug. 30, 1945, p. 132 "Threaded Lock-Pin Replaces Taper Pin in Toolholder".

Primary Examiner—Z. R. Bilinsky
Attorney, Agent, or Firm—Basile and Hanlon

[57] ABSTRACT

A coupling structure includes a coupling member having a cylindrical, axially slotted end with a cylindrical opening extending therethrough and perpendicular thereto having an axis of generation parallel to the sides of the slot and including a conical surface, a conical member within the opening having a conical surface in contact with the opening's conical surface and threaded structure for axially adjustably securing the conical member in the opening. A tapered liner may surround the slotted end of the coupling member and a threaded insert may be provided over one end of the opening for receiving an end of the conical member. One embodiment includes one conical surface in the opening and one conical member provided within the opening. A second embodiment includes two separate conical surfaces in the opening along with two separate conical members in opposite ends of the opening connected by and axially adjustable along a liner member. A coupling method includes securing a coupling member having a slot in one end thereof to a second member by passing a conical member into the slot transversely of the coupling member to expand the one end of coupling member in a recess in the second member while urging the coupling member into the recess. One embodiment includes passing a single conical member into a conical opening in the slot. In a second embodiment, conical members are provided in both ends of the opening in the slot.

15 Claims, 3 Drawing Sheets

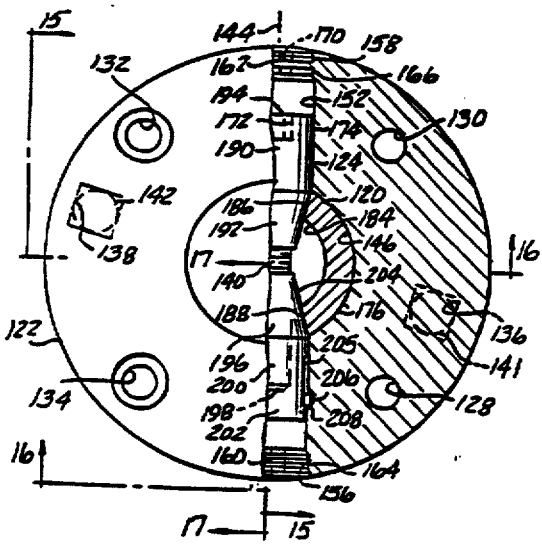

UNITED STATES PATENT AND TRADEMARK OFFICE
CERTIFICATE OF CORRECTION

Page 3 of 5

PATENT NO. : 5,341,710
DATED : August 30, 1994
INVENTOR(S) : Bruce G. Peuterbaugh It is certified that error appears in the above-indentified patent and that said Letters Patent is hereby corrected as shown below:

In Figure 13, please change "92" to "94", as shown below.

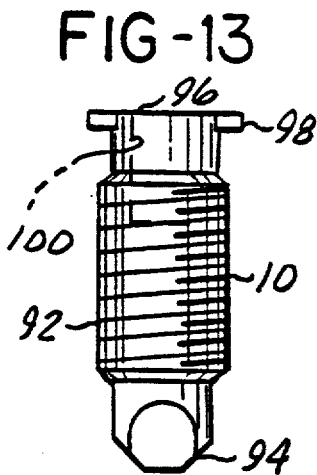

UNITED STATES PATENT AND TRADEMARK OFFICE
CERTIFICATE OF CORRECTION

Page 4 of 5

PATENT NO. : 5,341,710
DATED : August 30, 1994
INVENTOR(S) : Bruce G. Peuterbaugh It is certified that error appears in the above-indentified patent and that said Letters Patent is hereby corrected as shown below:

In Figure 14, please change "192" to "190", as shown below.

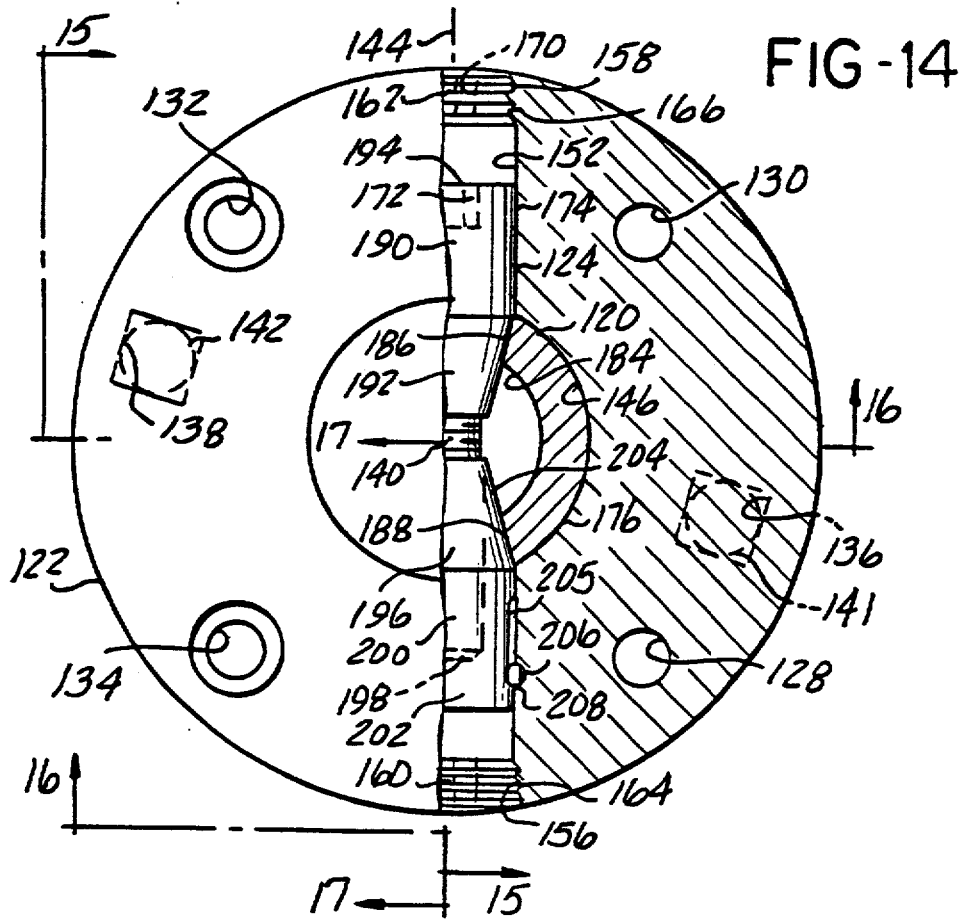

UNITED STATES PATENT AND TRADEMARK OFFICE
CERTIFICATE OF CORRECTION

Page 5 of 5

PATENT NO. : 5,341,710
DATED : August 30, 1994
INVENTOR(S) : Bruce G. Peuterbaugh It is certified that error appears in the above-indentified patent and that said Letters Patent is hereby corrected as shown below:

In Figure 16, please change "144" to "160", as shown below.